United States Patent
Chen et al.

(10) Patent No.: US 11,169,661 B2
(45) Date of Patent: *Nov. 9, 2021

(54) THUMBNAIL GENERATION FOR DIGITAL IMAGES

(71) Applicant: INTERNATIONAL BUSINESS MACHINES CORPORATION, Armonk, NY (US)

(72) Inventors: Jin Yan Chen, Shanghai (CN); Fang Lu, Shanghai (CN); Li Wang, Shanghai (CN); Dan Zhang, Shanghai (CN); Xi Fang Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/610,387

(22) Filed: May 31, 2017

(65) Prior Publication Data
US 2018/0348857 A1   Dec. 6, 2018

(51) Int. Cl.
*G06F 3/0482* (2013.01)
*G06K 9/00* (2006.01)
(Continued)

(52) U.S. Cl.
CPC ........ *G06F 3/0482* (2013.01); *G06F 3/04817* (2013.01); *G06F 16/54* (2019.01);
(Continued)

(58) Field of Classification Search
CPC ........... H04N 5/23219; H04N 1/00307; H04N 1/00442; H04N 2201/3205; H04N 1/2179; H04N 1/00196; H04N 1/00161; H04N 1/00456; H04N 2201/3273; G06F 3/0482; G06F 16/434; G06F 16/5854; G06F 3/012; G06F 16/50; G06F 16/58; G06F 3/04842; G06F 16/583; G06F 16/10; G06F 3/04817; G06F 16/54; G06F 16/903; G06F 3/04845; G06F 16/00; G06F 16/14; G06F 16/248; G06F 16/7335; G06F 16/738; G06F 16/2455; G06F 3/04847; G06F 3/0488; G06F 3/0484; G06F 3/048; G06F 3/0481; G06F 2203/04805; G06F 9/451; G06F 16/784; H04L 41/22; G06K 9/00295;
(Continued)

(56) References Cited

U.S. PATENT DOCUMENTS 6,154,755 A   11/2000  Dellert
6,515,765 B1   2/2003  Umebayashi
(Continued)

OTHER PUBLICATIONS

P. Corcoran and G. Costache, "Automated sorting of consumer image collections using face and peripheral region image classifiers," in IEEE Transactions on Consumer Electronics, vol. 51, No. 3, pp. 747-754, Aug. 2005, doi: 10.1109/TCE.2005.1510478. (Year: 2005).*

(Continued)

*Primary Examiner* — David S Posigian
(74) *Attorney, Agent, or Firm* — Tihon Poltavets (57) ABSTRACT

Detecting a first facial region in a first image. Extracting the detected first facial region. Generating a first facial thumbnail based on the extracted first facial region for use in representing the first image.

4 Claims, 7 Drawing Sheets

(51) Int. Cl.
*G06F 16/54* (2019.01)
*G06F 3/0481* (2013.01)
*G06F 16/583* (2019.01)
G06K 9/62 (2006.01)
G06K 9/46 (2006.01)

(52) U.S. Cl.
CPC ....... *G06F 16/583* (2019.01); *G06K 9/00268* (2013.01); *G06K 9/6267* (2013.01); *G06K 2009/4666* (2013.01)

(58) Field of Classification Search
CPC ........... G06K 9/00228; G06K 9/00268; G06K 9/6267; G06K 2009/4666; G06K 9/00221–00315; G06K 2009/00322–00328; G06T 3/40–4092
USPC .......................................... 715/838; 382/118
See application file for complete search history.

(56) References Cited

U.S. PATENT DOCUMENTS

| | | | |
|---|---|---|---|
| 6,816,611 B1* | 11/2004 | Hagiwara | G06K 9/4647 340/5.53 |
| 7,515,740 B2 | 4/2009 | Corcoran | |
| 7,551,755 B1 | 6/2009 | Steinberg | |
| 7,689,011 B2 | 3/2010 | Luo | |
| 7,758,408 B2 | 7/2010 | Hagentoft | |
| 7,813,557 B1 | 10/2010 | Bourdev | |
| 7,835,549 B2* | 11/2010 | Kitamura | G06K 9/6256 382/118 |
| 7,916,894 B1* | 3/2011 | Dhillon | G06F 16/784 382/103 |
| 7,916,976 B1 | 3/2011 | Kedikian | |
| 8,050,465 B2* | 11/2011 | Ianculescu | G06K 9/00228 382/118 |
| 8,390,669 B2 | 3/2013 | Catchpole | |
| 8,531,478 B2 | 9/2013 | Lee et al. | |
| 8,553,949 B2 | 10/2013 | Steinberg | |
| 8,724,908 B2* | 5/2014 | Dale | G06K 9/6254 382/224 |
| 8,781,178 B2 | 7/2014 | Nagaoka et al. | |
| 8,897,505 B2* | 11/2014 | Gokturk | G06K 9/00375 382/118 |
| 8,995,715 B2 | 3/2015 | Sultana | |
| 9,001,254 B2 | 4/2015 | Kang | |
| 9,098,760 B2* | 8/2015 | Saito | G06K 9/036 |
| 9,152,849 B2 | 10/2015 | Ganong | |
| 9,213,886 B2* | 12/2015 | Park | G06K 9/00912 |
| 9,286,509 B1* | 3/2016 | Rodriguez | H04N 5/23219 |
| 9,367,756 B2* | 6/2016 | Pillai | G06K 9/00288 |
| 9,430,694 B2* | 8/2016 | Iliadis | G06F 16/285 |
| 9,448,704 B1* | 9/2016 | Belhumeur | G06F 3/04842 |
| 9,489,567 B2* | 11/2016 | Wang | G06K 9/00288 |
| 9,509,959 B2 | 11/2016 | Roh | |
| 9,600,712 B2 | 3/2017 | Jin | |
| 9,684,988 B2 | 6/2017 | Shimamura | |
| 9,710,709 B1 | 7/2017 | Beard | |
| 9,727,312 B1 | 8/2017 | Svendsen | |
| 9,851,873 B2 | 12/2017 | Yonaha | |
| 9,870,507 B2 | 1/2018 | Yamaji | |
| 9,894,280 B2 | 2/2018 | Sakaguchi | |
| 10,025,457 B2 | 7/2018 | Mizrachi | |
| 10,027,726 B1* | 7/2018 | Ozog | H04L 67/306 |
| 10,043,058 B2 | 8/2018 | Ahmed | |
| 10,140,517 B2 | 11/2018 | Babenko | |
| 10,198,626 B2 | 2/2019 | Li | |
| 10,216,829 B2 | 2/2019 | Marshall | |
| 10,269,164 B1* | 4/2019 | Song | G06F 3/04883 |
| 10,291,841 B2 | 5/2019 | Kim | |
| 10,541,999 B1 | 1/2020 | Rosenberg | |
| 10,706,601 B2 | 7/2020 | Svendsen | |
| 2001/0031072 A1 | 10/2001 | Dobashi | |
| 2002/0140820 A1 | 10/2002 | Borden | |
| 2003/0108225 A1* | 6/2003 | Li | G06K 9/00268 382/118 |
| 2004/0064510 A1 | 4/2004 | Ooi | |
| 2004/0091137 A1* | 5/2004 | Yoon | G06K 9/00268 382/118 |
| 2004/0172440 A1 | 9/2004 | Nakajima | |
| 2004/0264780 A1 | 12/2004 | Zhang | |
| 2006/0078201 A1 | 4/2006 | Kim | |
| 2006/0133699 A1* | 6/2006 | Widrow | G06K 9/62 382/305 |
| 2006/0140614 A1* | 6/2006 | Kim | H04N 5/232 396/153 |
| 2006/0204055 A1* | 9/2006 | Steinberg | H04N 5/23212 382/118 |
| 2006/0238653 A1 | 10/2006 | Tobita | |
| 2006/0274960 A1* | 12/2006 | Tamaru | G06F 16/51 382/274 |
| 2007/0047824 A1 | 3/2007 | Ito | |
| 2007/0053571 A1* | 3/2007 | Hayashi | H04N 1/00132 382/131 |
| 2007/0058872 A1* | 3/2007 | Jang | H04N 19/44 382/233 |
| 2007/0064278 A1 | 3/2007 | Sugimoto | |
| 2007/0071319 A1* | 3/2007 | Fukushima | G06K 9/00228 382/173 |
| 2007/0103565 A1* | 5/2007 | Xu | G06F 16/50 348/231.2 |
| 2007/0110305 A1 | 5/2007 | Corcoran | |
| 2008/0007783 A1* | 1/2008 | Terada | H04N 1/00198 358/1.18 |
| 2008/0037838 A1 | 2/2008 | Ianculescu | |
| 2008/0089561 A1 | 4/2008 | Zhang | |
| 2008/0122943 A1* | 5/2008 | Itoh | G06K 9/00228 348/222.1 |
| 2008/0146274 A1 | 6/2008 | Cho | |
| 2008/0152201 A1 | 6/2008 | Zhang | |
| 2008/0155422 A1 | 6/2008 | Manico | |
| 2008/0240563 A1 | 10/2008 | Takano | |
| 2008/0247600 A1* | 10/2008 | Date | G11B 27/28 382/103 |
| 2008/0298766 A1 | 12/2008 | Wen | |
| 2008/0309795 A1* | 12/2008 | Mitsuhashi | G11B 27/105 348/231.99 |
| 2009/0034805 A1 | 2/2009 | Perlmutter | |
| 2009/0037477 A1* | 2/2009 | Choi | G06F 16/5854 |
| 2009/0046954 A1* | 2/2009 | Ishii | G06K 9/00221 382/312 |
| 2009/0087037 A1* | 4/2009 | Wada | G06K 9/00664 382/118 |
| 2009/0087102 A1 | 4/2009 | Lee | |
| 2009/0089822 A1* | 4/2009 | Wada | G06F 16/70 725/10 |
| 2009/0169065 A1 | 7/2009 | Wang | |
| 2009/0172545 A1 | 7/2009 | Yokoi | |
| 2009/0238419 A1 | 9/2009 | Bigioi | |
| 2009/0252383 A1 | 10/2009 | Adam | |
| 2010/0066822 A1* | 3/2010 | Steinberg | G06K 9/00208 348/77 |
| 2010/0073506 A1 | 3/2010 | Uehara | |
| 2010/0085446 A1 | 4/2010 | Thörn | |
| 2010/0091135 A1* | 4/2010 | Iwamoto | G06K 9/00221 348/229.1 |
| 2010/0104177 A1 | 4/2010 | Homma | |
| 2010/0125816 A1* | 5/2010 | Bezos | G06F 3/013 715/863 |
| 2010/0182501 A1* | 7/2010 | Sato | G06T 11/60 348/441 |
| 2010/0209000 A1 | 8/2010 | Usui | |
| 2010/0215274 A1* | 8/2010 | Kosugiyama | H04N 1/00442 382/190 |
| 2010/0226584 A1* | 9/2010 | Weng | G06K 9/00221 382/225 |
| 2010/0238191 A1* | 9/2010 | Lee | G06K 9/00221 345/589 |
| 2010/0315528 A1* | 12/2010 | Goh | H04N 5/23212 348/222.1 |
| 2011/0013003 A1 | 1/2011 | Thompson | |

(56) References Cited

U.S. PATENT DOCUMENTS

| | | |
|---|---|---|
| 2011/0025873 A1 | 2/2011 | Wang |
| 2011/0032378 A1* | 2/2011 | Kaneda ............... G06K 9/00248 348/222.1 |
| 2011/0043437 A1* | 2/2011 | Tang ..................... G06F 16/583 345/55 |
| 2011/0135153 A1* | 6/2011 | Tsurumi ............. G06K 9/00295 382/103 |
| 2011/0188713 A1 | 8/2011 | Chin |
| 2011/0200273 A1* | 8/2011 | Singhal ................ G06K 9/3233 382/284 |
| 2011/0212717 A1* | 9/2011 | Rhoads .................. G06F 16/58 455/420 |
| 2011/0221911 A1 | 9/2011 | Kang |
| 2011/0243397 A1 | 10/2011 | Watkins |
| 2011/0243431 A1* | 10/2011 | Sangappa .......... G06K 9/00228 382/164 |
| 2012/0008837 A1* | 1/2012 | Goldberg ............... G06K 9/033 382/118 |
| 2012/0020643 A1* | 1/2012 | Kato ..................... G11B 27/034 386/241 |
| 2012/0131507 A1* | 5/2012 | Sparandara ............ G16H 10/60 715/833 |
| 2012/0314912 A1 | 12/2012 | Nakagomi |
| 2012/0314915 A1 | 12/2012 | Ochi |
| 2013/0010154 A1 | 1/2013 | Maeda |
| 2013/0016255 A1 | 1/2013 | Bhatt |
| 2013/0022244 A1 | 1/2013 | Nagata |
| 2013/0147959 A1 | 6/2013 | Wang |
| 2013/0163829 A1 | 6/2013 | Kim |
| 2013/0169556 A1* | 7/2013 | Kim ..................... G06F 3/04883 345/173 |
| 2013/0212534 A1 | 8/2013 | Knight |
| 2013/0263056 A1* | 10/2013 | Son .......................... G09G 5/14 715/838 |
| 2013/0279811 A1* | 10/2013 | Cheng ................ G06K 9/00228 382/195 |
| 2013/0322746 A1* | 12/2013 | Cote ......................... G06T 1/20 382/163 |
| 2014/0010463 A1 | 1/2014 | Kato et al. |
| 2014/0035852 A1 | 2/2014 | Sungchae |
| 2014/0067679 A1 | 3/2014 | O'Reilly |
| 2014/0086450 A1* | 3/2014 | Huang ................ G06K 9/00295 382/103 |
| 2014/0092424 A1* | 4/2014 | Grosz .................... G06F 3/1242 358/1.15 |
| 2014/0104477 A1 | 4/2014 | Choi et al. |
| 2014/0140584 A1 | 5/2014 | Lee |
| 2014/0181089 A1 | 6/2014 | Desmond |
| 2014/0193047 A1* | 7/2014 | Grosz .................... G06F 3/1242 382/118 |
| 2014/0195921 A1* | 7/2014 | Grosz .................... G06F 3/1242 715/738 |
| 2014/0198234 A1* | 7/2014 | Kobayashi ........... H04N 1/2129 348/231.99 |
| 2014/0286625 A1* | 9/2014 | Matsubara ................ G06T 3/40 386/278 |
| 2014/0304278 A1 | 10/2014 | Kleiman et al. |
| 2014/0313415 A1 | 10/2014 | Yokomitsu |
| 2014/0321770 A1* | 10/2014 | Potdar ..................... G06T 11/60 382/282 |
| 2014/0324921 A1 | 10/2014 | Tobita |
| 2014/0327806 A1 | 11/2014 | Jung |
| 2014/0337791 A1* | 11/2014 | Agnetta ................ G06F 3/0485 715/784 |
| 2014/0354874 A1 | 12/2014 | Lee |
| 2015/0067513 A1* | 3/2015 | Zambetti ............... G06F 3/0488 715/716 |
| 2015/0131925 A1 | 5/2015 | Saito |
| 2015/0161435 A1 | 6/2015 | Jung |
| 2015/0169166 A1 | 6/2015 | Kim |
| 2015/0221343 A1 | 8/2015 | Yamaji |
| 2015/0242707 A1 | 8/2015 | Wilf |
| 2015/0243031 A1* | 8/2015 | Narasimha ........... G06K 9/6256 382/103 |
| 2015/0264302 A1* | 9/2015 | Chastney ................ H04W 4/12 386/224 |
| 2015/0271553 A1 | 9/2015 | Pomeroy |
| 2015/0278590 A1 | 10/2015 | Gunjan |
| 2015/0279428 A1 | 10/2015 | Ryu |
| 2015/0310040 A1 | 10/2015 | Chan et al. |
| 2015/0331566 A1 | 11/2015 | Yonaha |
| 2016/0011737 A1* | 1/2016 | Kang .................... G06F 3/0488 715/808 |
| 2016/0065856 A1* | 3/2016 | Sohn .................. H04N 5/23258 348/333.11 |
| 2016/0078904 A1 | 3/2016 | Yamaji |
| 2016/0140383 A1 | 5/2016 | Kim |
| 2016/0217313 A1 | 7/2016 | Cuti |
| 2016/0248966 A1 | 8/2016 | Qin |
| 2016/0292494 A1* | 10/2016 | Ganong ............. G06K 9/00288 |
| 2017/0068847 A1 | 3/2017 | El Kaliouby |
| 2017/0118413 A1 | 4/2017 | Shin |
| 2017/0171614 A1 | 6/2017 | El Kaliouby |
| 2017/0213385 A1* | 7/2017 | Yu ........................... G06T 17/20 |
| 2017/0249341 A1* | 8/2017 | Gao ...................... H04L 65/403 |
| 2017/0270353 A1* | 9/2017 | Yamaji ................. G06K 9/6267 |
| 2017/0308254 A1* | 10/2017 | Yokouchi ............... G06T 11/60 |
| 2018/0048823 A1* | 2/2018 | Kang ..................... G06F 3/167 |
| 2018/0173377 A1 | 6/2018 | Geng |
| 2018/0241961 A1 | 8/2018 | Choi |
| 2018/0373859 A1* | 12/2018 | Ganong ................ G06F 21/32 |
| 2019/0080188 A1 | 3/2019 | Zhou |
| 2020/0218435 A1 | 7/2020 | Desmond |

OTHER PUBLICATIONS

D. H. Kim, Y. Kim and H. Park, "Fast and Efficient Face Image Browsing System on Consumer Electronics Devices," Ninth IEEE International Symposium on Multimedia Workshops (ISMW 2007), Beijing, 2007, pp. 329-334, doi: 10.1109/ISM.Workshops.2007.62. (Year: 2007).*

M. Abdel-Mottaleb and Longbin Chen, "Content-based photo album management using faces' arrangement," 2004 IEEE International Conference on Multimedia and Expo (ICME) (IEEE Cat. No.04TH8763), Taipei, 2004, pp. 2071-2074 vol. 3, doi: 10.1109/ICME.2004.1394673. (Year: 2004).*

Chen, et al., "Thumbnail Generation for Digital Images", U.S. Appl. No. 15/845,075, filed Dec. 18, 2017.

Chen, et al., "Thumbnail Generation for Digital Images", U.S. Appl. No. 15/848,548, filed Dec. 20, 2017.

IBM Appendix P, "List of IBM Patents or Patent Applications Treated as Related", Dated Dec. 20, 2017, 2 pages.

Mell et al., "The NIST Definition of Cloud Computing", National Institute of Standards and Technology, Special Publication 800-145, Sep. 2011, pp. 1-7.

Miller, "Browse, view photos based on face recognition tech", http://www.geek.com/blurb/browse-view-photos-based-on-face-recognition-tech-562040/, printed May 31, 2017, pp. 1-10.

Chen et al., "Content-based photo album management using faces' arrangement", 2004 IEEE International Conference on Multimedia and Expo (ICME) (IEEE Cat. No. 04TH8763), Taipei, 2004, pp. 2071-2074 vol. 3, doi:10.1109/ICME.2004.1394673. (Year 2004).

Yamamoto et al., "Fast face clustering using similar shots for face navigation of TV programs", 2009 IEE 13th International Symposium on Consumer Electronics, Kyoto 2009, pp. 251-254, Year 2009.

* cited by examiner

THUMBNAIL GENERATION FOR DIGITAL IMAGES

BACKGROUND

The present disclosure relates to generating thumbnails for digital images, and more specifically, to a method, device and computer program product for generating thumbnails for the digital images.

Typically, digital images are represented in the form of corresponding thumbnails when organized in an album by electronic devices, such as mobile phones, tablets, cameras, laptops, or the like. The thumbnails ("full thumbnails") for the digital images may take the form of scaled-down versions of the digital images. In some cases, a full thumbnail for a digital image can contain one or more facial images or regions, making it difficult for a user to see the facial regions in the full thumbnail because the facial regions in the full thumbnail are small.

SUMMARY

Embodiments of the invention are directed to a method, system, and computer program product for representing an image with a generated facial thumbnail. A first facial region in a first image is detected and extracted by a computer system. A first facial thumbnail based on the extracted facial region is generated by the computer system. The generated first facial thumbnail is used by the computer system to represent the image.

According to an aspect of an embodiment of the invention, a determination as to whether a number of occurrences of a first face in the detected first facial region in the first image and one or more other images residing in a directory exceeds a number of occurrences of a second face in a detected second facial region in the first image and the one or more other images in the directory, is made by the computer system. Where the number of occurrences of the first face exceeds that of the second, the first facial thumbnail is generated by the computer system based on the extracted first facial region.

According to another aspect of an embodiment of the invention, a determination as to whether a first distance of the first facial region from a center of the first image is less than a second distance of the second facial region from the center of the first image, is made by the computer system. Where the first distance exceeds is less than that of the second, the first facial thumbnail is generated by the computer system based on the extracted first facial region.

According to yet another aspect of an embodiment of the invention, a user input comprising a selection of either of the first or second facial thumbnails is received by the computer system and used to determine the appropriate facial thumbnail to use in representing the first image.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The following detailed description, given by way of example and not intended to limit the invention solely thereto, will best be appreciated in conjunction with the accompanying drawings.

Throughout the drawings, same or similar reference numerals represent the same or similar element.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
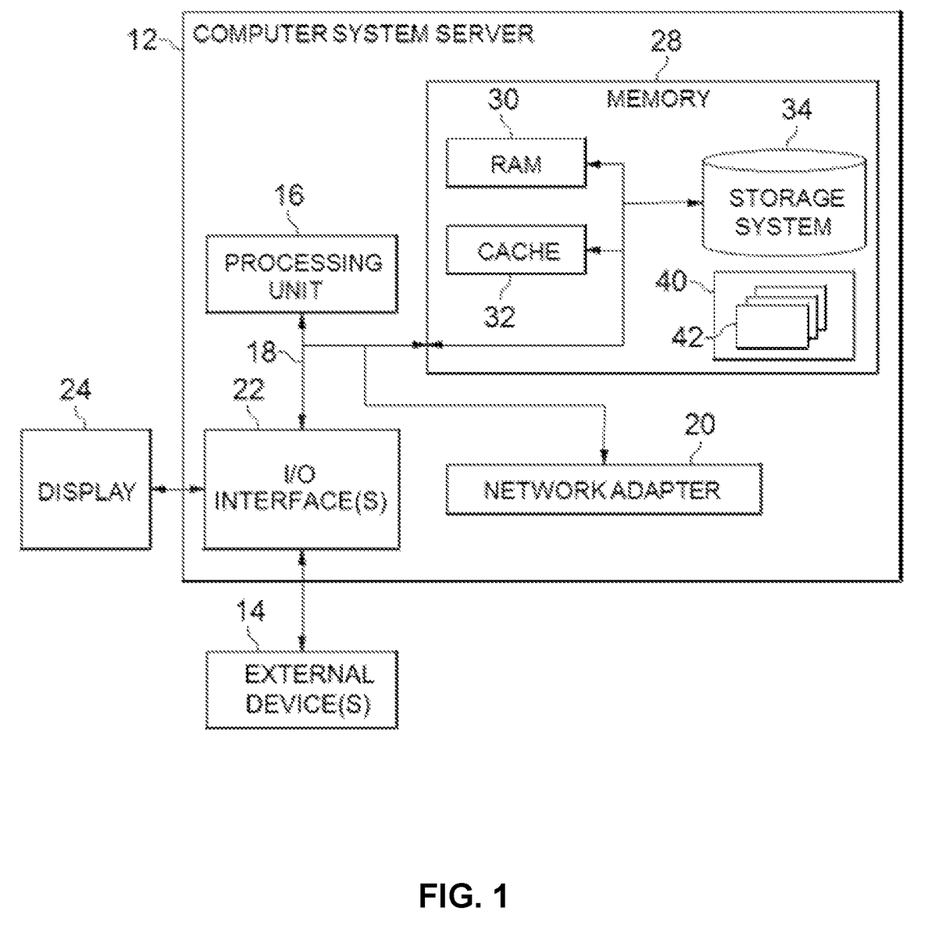
FIG. 1 is a block diagram depicting a cloud computing node, in accordance with an embodiment of the present invention.

FIG. 1 is a block diagram depicting a cloud computing node, in accordance with an embodiment of the present invention. Cloud computing node 10 is only one example of a suitable cloud computing node and is not intended to suggest any limitation as to the scope of use or functionality of embodiments of the invention described herein. Regardless, the cloud computing node 10 is capable of being implemented and/or performing any of the functionality set forth herein.

The cloud computing node 10 can include, for example, a computer system/server 12 such as in the form of a portable communication electronic device, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any combination of the above systems or devices, or the like.

The computer system/server 12 can be described in the general context of computer system-executable instructions, such as program modules, being executed by a computer system. Generally, program modules can include routines, programs, objects, components, logic, data structures, and so on, that perform particular tasks or implement particular data types. The computer system/server 12 can be practiced in distributed cloud computing environments where tasks are performed by remote processing devices that are linked through a communications network. In a distributed cloud computing environment, program modules can be located in both local and remote computer system storage media, including, for example, memory storage devices.

With continued reference to FIG. 1, the computer system/server 12 in the cloud computing node 10 is shown in the form of a general-purpose computing device. The components of the computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. The computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As further described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

The computer system/server 12 can also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Still yet, the computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
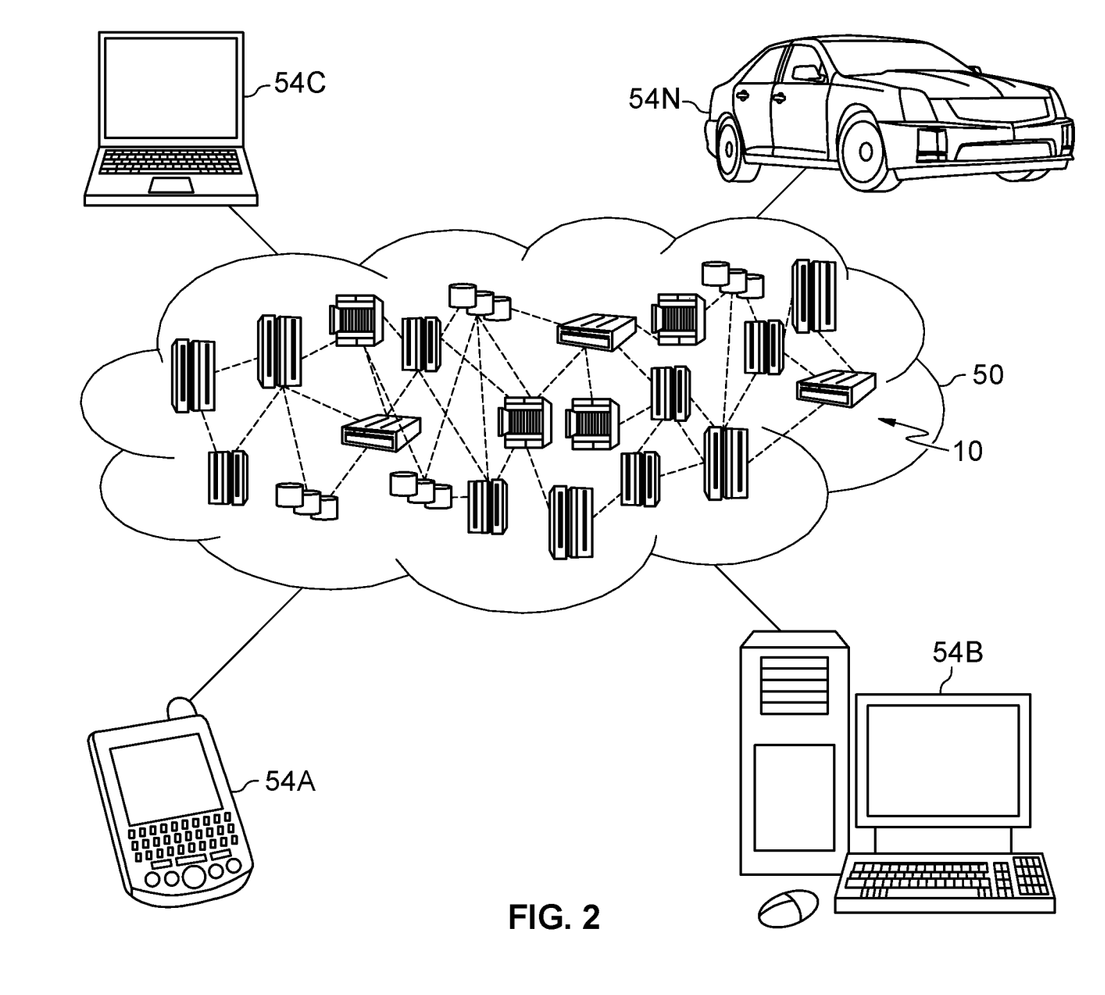
FIG. 2 depicts a cloud computing environment, in accordance with an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
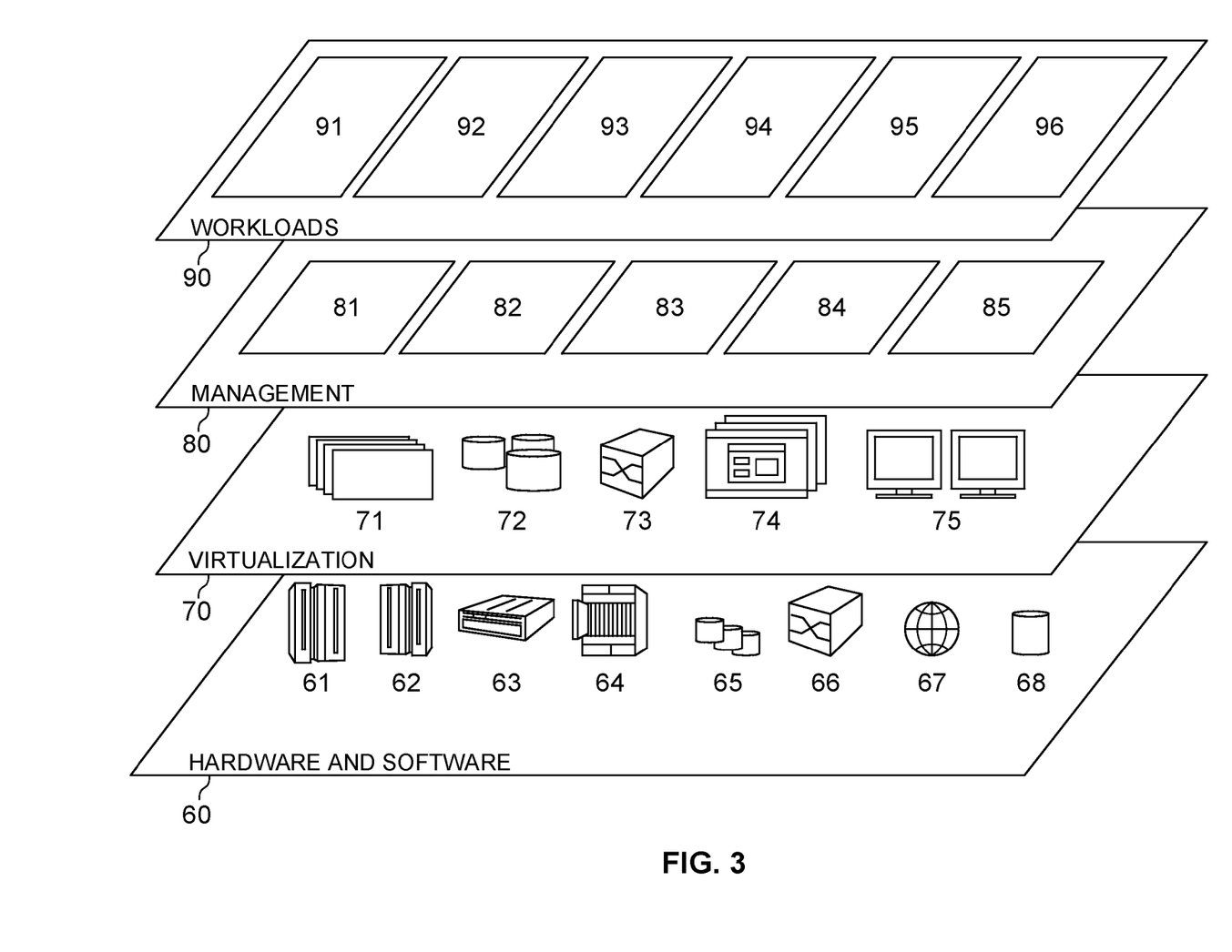
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating thumbnails for images 96.

Figure 4:
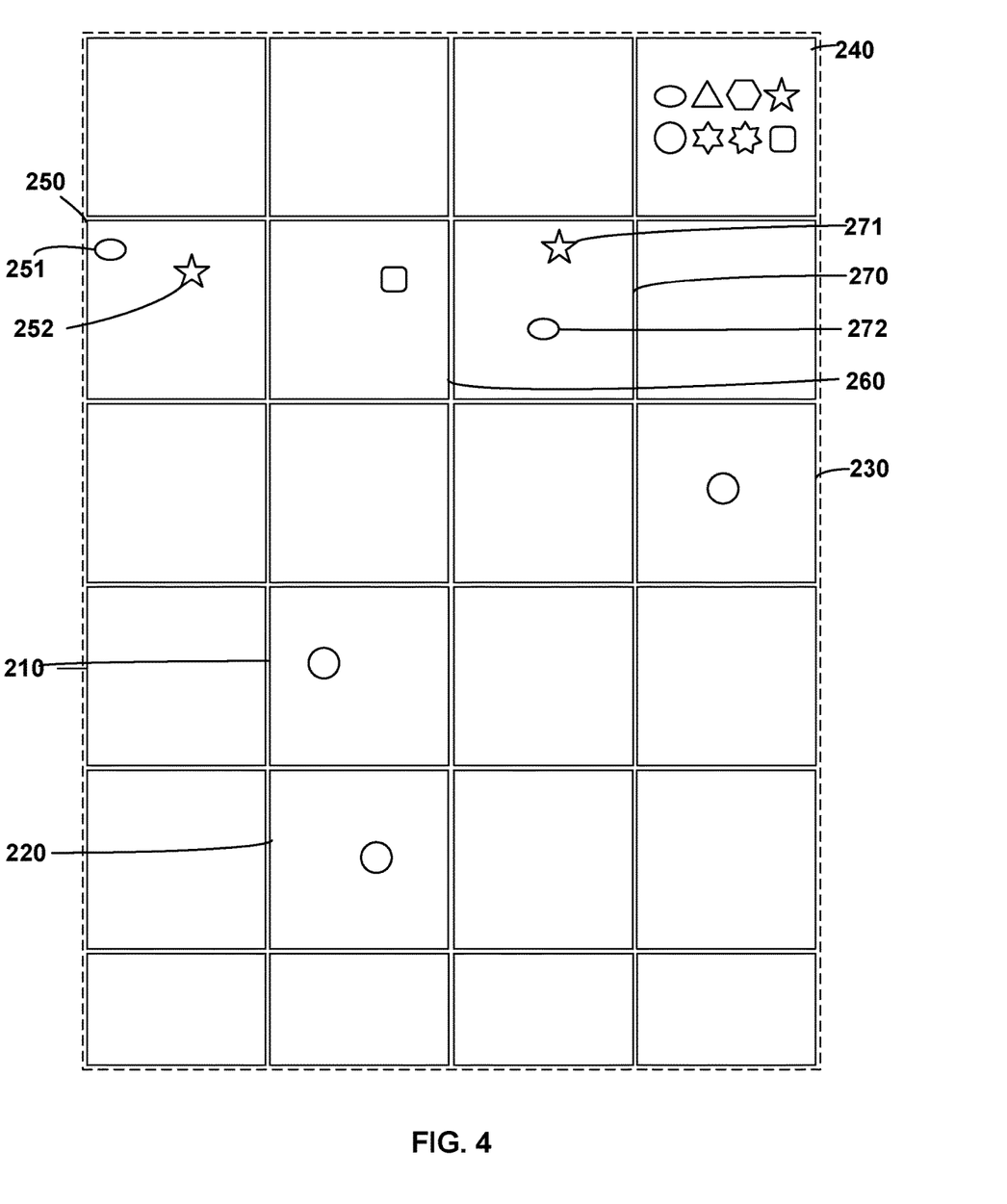
FIG. 4 is a schematic diagram depicting a traditional method for browsing images, in accordance with an embodiment of the present invention.

FIG. 4 is a schematic diagram depicting a traditional method for browsing images, in accordance with an embodiment of the present invention. As shown in FIG. 4, digital images are represented in the form of corresponding thumbnails when organized in an album by electronic devices. The electronic device may include, but are not limited to, a server, a personal computer, a mobile phone, a tablet computer, a portable digital assistant (PDA), a wearable device, or the like. Full thumbnails for twenty-four digital images can be displayed, for example, on the display 24 as shown in FIG. 1.

As can be seen from FIG. 4, there can be a degree of perceived similarity among full thumbnails 210, 220 and 230, because the thumbnails 210, 220 and 230 contain facial regions for the same person. Since the facial regions in the full thumbnails 210, 220 and 230 are small, it can be difficult for a user to distinguish between the facial regions in the full thumbnails. In such cases, if the user would like to select a desirable image from digital images corresponding to the full thumbnails 210, 220 and 230, the user would be required to click on and enlarge one of the full thumbnails 210, 220 and 230, and repeatedly flip back and forth through a plurality of digital images. If the album contains a great number of digital images of the person, the process of selecting the desirable image will be cumbersome, time consuming, or will otherwise require a lot of effort by the user. For ease of discussion in the context of the present disclosure, the images that each contain at least one facial region may be referred to as a first group of images. In the example as shown in FIG. 4, the first group of images includes images corresponding to full thumbnails 210-270.

Embodiments of the present invention are directed to generating thumbnails corresponding to digital images that can be easily distinguished using facial regions of the digital images. According to embodiments of the present invention, a determination as to whether the digital image contains at least one facial region can be made, where the at least one facial region can be detected, and a corresponding facial thumbnail can be generated for display. The facial thumbnail can highlight or enlarge the facial region, enabling the user to see the facial region quickly at a glance, and to easily distinguish the corresponding digital image from other, similar digital images. As a result, the user can more readily select a desirable image from a large number of digital images.

With continued reference to FIG. 4, one or more digital images in the first group of images may contain a plurality of facial regions. In various embodiments of the present invention, one or more of the plurality of facial regions can be detected, selected, and presented in a generated facial thumbnail. For example, as in the digital images corresponding to the full thumbnails 240, 250 and 270 contain 8, 2, and 2 facial regions, respectively, the one or more of the plurality of facial regions can be detected, selected, and presented in a generated facial thumbnail.

Figure 5:
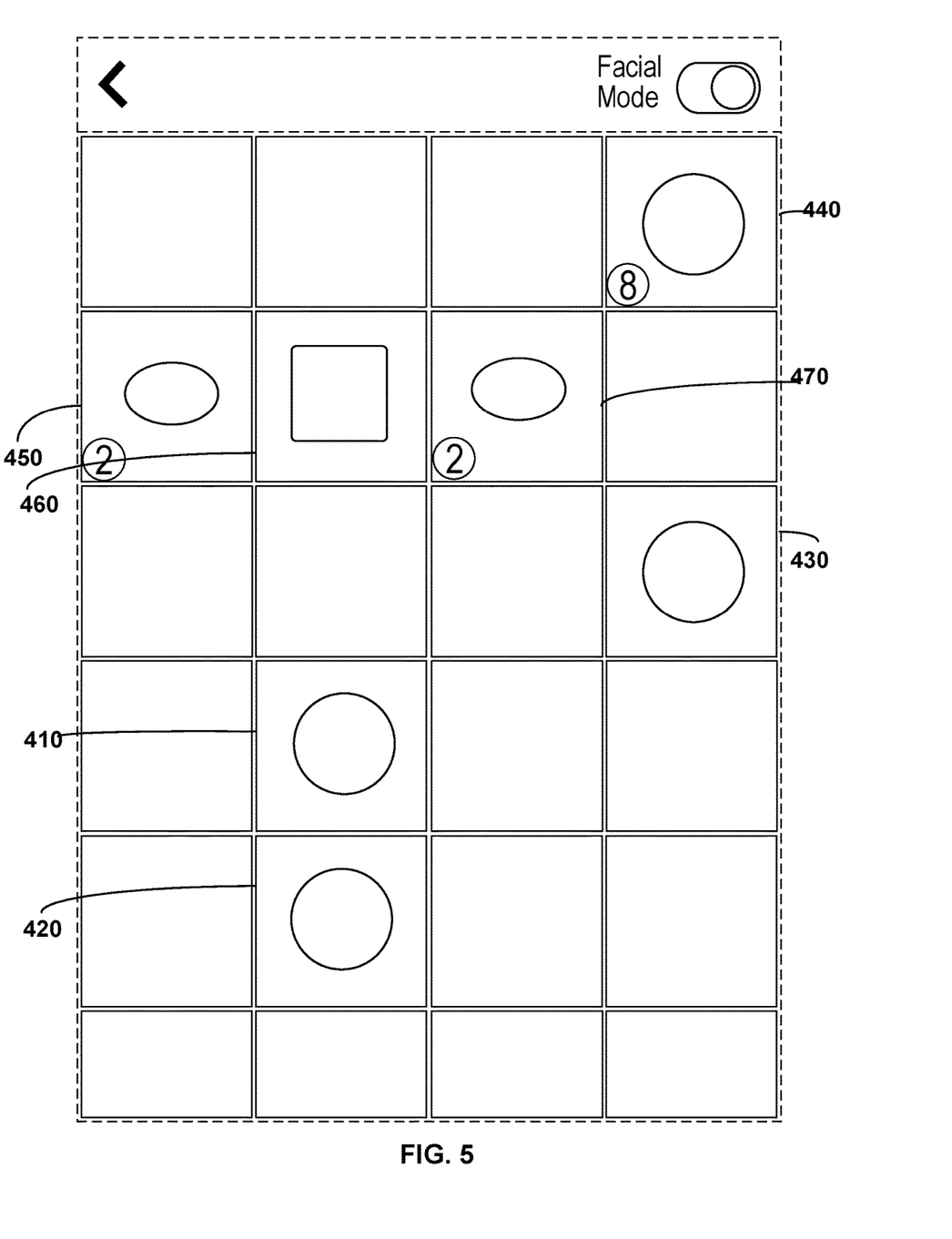
FIG. 5 is a schematic diagram depicting aspects of a method for browsing images, in accordance with an embodiment of the present invention.

FIG. 5 is a schematic diagram depicting aspects of a method for browsing images, in accordance with an embodiment of the present invention. As depicted, the user interface of the computing device 12 can be provided with a "facial mode" button. If the user turns on the "facial mode" button, the "facial mode" will be enabled and in turn the facial recognition will be initiated. If the user turns off the "facial mode" button, the "facial mode" will be disabled and a normal mode will be returned. In the normal mode, the full thumbnails for the digital images can be displayed. The number of facial regions can also be determined and presented in the facial thumbnails. For example, the digital images corresponding to the full thumbnails 240, 250 and 270 containing 8, 2 and 2 facial regions, respectively, as previously described, can each be detected, selected, and presented in each of facial thumbnails 440, 450 and 470, respectively.

In various embodiments, the face recognition can be performed on the digital images displayed on the display 24 as shown in FIG. 1. For example, the face recognition may be performed on the digital images as shown in FIG. 4, with respect to the full thumbnails. Because the number of the digital images that can be displayed is usually small, the amount of the time required for the face recognition is also small. Thus, the user's experience can be improved. The face recognition can be performed on digital images of the same type, digital images residing in a directory of the computing system 12, digital images residing in a directory of a computing node identified by a particular network address, or the like. The facial region containing the face with the maximum occurrence number can be selected. In other embodiments, the at least one facial region can be selected randomly or based on input of a user.

With continued reference to FIG. 5, where a digital image in the first group of images contains a plurality of facial regions, the facial thumbnail for one of the plurality of facial regions can be displayed in a first browsing view, for example, as shown in FIG. 5. In a digital image in the first group of images containing the plurality of facial regions, one facial region can be selected from the plurality of facial regions. The selection can be done automatically. In the context of the present disclosure, a face as presented in a facial thumbnail is also referred to as a "default face". In various embodiments, the one facial region can be selected randomly, or selected based on a predefined rule. The group of digital images can comprise the at least one image and the other one or more images in the same directory of or being relevant with the at least one image.

For example, occurrence numbers of faces in the plurality of facial regions in the first group of digital images can be determined and one of the plurality of facial regions can be selected based on the occurrence numbers. In this regard, the plurality of facial regions can be ranked in a descending order of the occurrence numbers and a facial region having the maximum of the occurrence numbers may be selected. In various embodiments, in order to detect the facial regions in the digital images, any face recognition algorithm that is known or is to be developed in the future may be applied to the digital images. Examples of the digital images may include, but are not limited to, a digital photo obtained by photography, the edited photo, a picture in digital form, and the like. The scope of the present disclosure is not limited in this regard.

In response to receiving a user input, for example, clicking on the number "8" presented in the facial thumbnail 440, eight facial thumbnails for the eight facial regions can be generated and displayed in a second browsing view, as described in further detail below. For example, as shown in FIG. 4, the digital image corresponding to the full thumbnail 240 contains eight facial regions. The facial thumbnail 440 for one of the eight facial regions can be displayed in the first browsing view, as shown in FIG. 5. Examples of the user input can include, but are not limited to, clicking on the number presented in the facial thumbnail for one of the facial regions, a press-and-hold gesture, or a deep press gesture on the facial thumbnail. In various embodiments, two or more of the eight facial thumbnails can be combined to form a new facial thumbnail and the new facial thumbnail can be displayed in the first browsing view as shown in FIG. 6.

Figure 6:
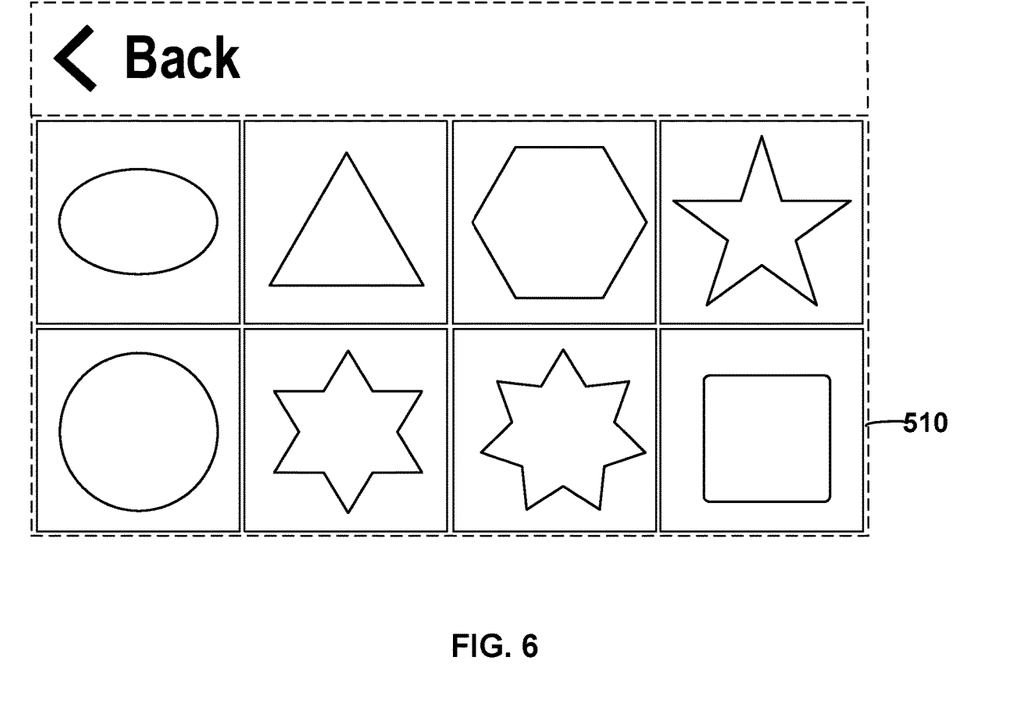
FIG. 6 is a schematic diagram depicting aspects of a method for browsing images, in accordance with an embodiment of the present invention.

FIG. 6 is a schematic diagram depicting aspects of a method for browsing images, in accordance with an embodiment of the present invention. The second browsing view is different from the first browsing view. In various embodiments, the user interface of the computing device 12 may be provided with a "Back" icon as shown in FIG. 6. If the user clicks on the "Back" icon, the user interface will be returned to the first browsing view from the second browsing view.

In various embodiments, a "default face" in a facial thumbnail in the first browsing view may be changed in response to receiving a user input. In particular, if the user selects one of the facial thumbnails in the second browsing view that is different from the facial thumbnail as displayed in the first browsing view, the facial thumbnail in the first browsing view will be replaced with the selected facial thumbnail for display. For example, if the user selects a facial thumbnail 510 as shown in FIG. 6, the facial thumbnail 440 as shown in FIG. 5 will be replaced with the facial thumbnail 510 for display. Alternatively, in response to receiving a user input, the previous facial thumbnail in the first browsing view and the selected facial thumbnail in the second browsing view may be displayed in the first browsing view side-by-side.

Consider the digital image corresponding to the full thumbnail 240 in FIG. 4 for example. In order to generate a facial thumbnail for one of the eight facial regions in the full thumbnail 240, the eight facial regions are extracted from the digital image. Occurrence numbers of eight faces in the images corresponding to the full thumbnails 210-270 may be determined. Then, the eight facial regions may be ranked in a descending order of the occurrence numbers. A facial region having a maximum of the occurrence numbers may be selected from the eight facial regions. The facial thumbnail for the selected facial region is generated and displayed.

For example, one face as shown in the full thumbnail 240 occurs in the digital images corresponding to the full thumbnails 210-240 and thus has an occurrence number of four. Other faces as shown in the full thumbnail 240 each have an occurrence number of one. Therefore, the facial region having the maximum of four is selected. A facial thumbnail for the selected facial region is generated and presented as shown in FIG. 6. The face as shown in the facial thumbnail 440 in FIG. 6.

In some embodiments, distances of the plurality of facial regions from a center of the digital image may be determined and one of the plurality of facial regions may be selected based on the distances. For example, the user may focus more on the facial region that is closest to the center of the digital image. In this regard, the plurality of facial regions may be ranked in a descending order of the distances and a facial region having a minimum of the distances may be selected from the plurality of facial regions.

In the embodiments where a digital image in the first group of images contains a plurality of facial regions, one of the plurality of facial regions may be extracted according to a received user input indicating the one facial region. In turn, a facial thumbnail for the extracted facial region may displayed in the first browsing view, as shown in FIG. 6 for example.

In some embodiments, upon selection of the one facial region, the size of the selected facial region may be adjusted to adapt a predetermined size of the facial thumbnail. In addition, for the ease of the user's view, the adjusted facial region may be positioned in the center of the facial thumbnail.

In some embodiments, a facial thumbnail may be switched between different facial regions in response to receiving a user input. In other words, a default face in the facial thumbnail may be changed in response to receiving the user input.

Specifically, in response to receiving a user input, a further facial region may be selected from a plurality of facial regions in a digital image and a facial thumbnail for the further facial region may be generated. In turn, the facial thumbnail that is currently displayed may be replaced with the facial thumbnail for the further facial region. The further facial region may be immediately subsequent to the currently presented facial region in the descending order of the occurrence numbers. Alternatively, the occurrence number of the further facial region may be equal to that of the currently presented facial region. Examples of the user input may include, but are not limited to, swipe in or tap on the facial thumbnail that is currently displayed.

Consider the facial thumbnail 440 as shown in FIG. 5 for example. If the user swipes in the facial thumbnail 440, a further facial region of the eight facial regions in the full thumbnail 240 in FIG. 4 will be selected. A facial thumbnail for the further facial region, for example, the facial thumbnail 510 as shown in FIG. 6, may be generated. In turn, the facial thumbnail 440 may be replaced with the facial thumbnail 510 for display in FIG. 5.

In some embodiments, a default face in a facial thumbnail may be changed in response to change of a default face in a further facial thumbnail.

In particular, in such embodiments, a first digital image and a second digital image in the first group of images may contain a plurality of facial regions respectively. It may be assumed that a first facial thumbnail for a first facial region in the first digital image is currently displayed. If the first facial thumbnail is replaced with a second facial thumbnail for a second facial region in the first digital image in response to a user input, similarities between the second facial region and the facial regions in the second digital image may be determined. If a degree or level of similarity between the second facial region and a third facial region in the second digital image is above a predetermined threshold, a facial thumbnail for the third facial region may be generated. In turn, the facial thumbnail for the second digital image may be replaced with the facial thumbnail for the third facial region for display.

For example, as shown in FIG. 4, a first digital image corresponding to the thumbnail 250 contains two facial regions and a second digital image corresponding to the thumbnail 270 contains two facial regions. It may be assumed that a facial thumbnail for a facial region 251 and a facial thumbnail for a facial region 271 are currently displayed. The facial thumbnail for the facial region 251 may be replaced, in response to a user input, with a facial thumbnail for a facial region 252, as shown in the facial thumbnail 450 in FIG. 6. Similarities between the facial region 252 and the facial regions in the second digital image may be determined. If a similarity between the facial region 252 and one facial region in the second digital image, for example, a facial region 272, is above a predetermined threshold, a facial thumbnail for the facial region 272 may be generated. Alternatively, if a similarity between the facial region 252 and one facial region (for example, a facial region 272) in the second digital image is greater than similarities between the facial region 252 and other facial regions in the second digital image, a facial thumbnail for the facial region 272 may be generated. In turn, the facial thumbnail for the facial region 271 may be replaced with the facial thumbnail for the facial region 272 for display, as shown in FIG. 6. Alternatively, the facial thumbnail for the facial region 271 and the facial thumbnail for the facial region 272 may be displayed parallelly.

It should be understood that the change of the default face in the second digital image is described for the purpose of illustration. Other digital images than the second digital image, for example, a digital image corresponding to a full thumbnail 260, may also contain a similar facial region to the facial region in the first digital image corresponding to the full thumbnail 250. In the circumstances, default faces in facial thumbnails for the other digital images may also be changed in response to the change of the default face in the facial thumbnail for the first digital image.

Because a default face in a facial thumbnail may be changed in response to change of a default face in a further facial thumbnail, it is convenient for the user to compare the same face in different digital images.

Figure 7:
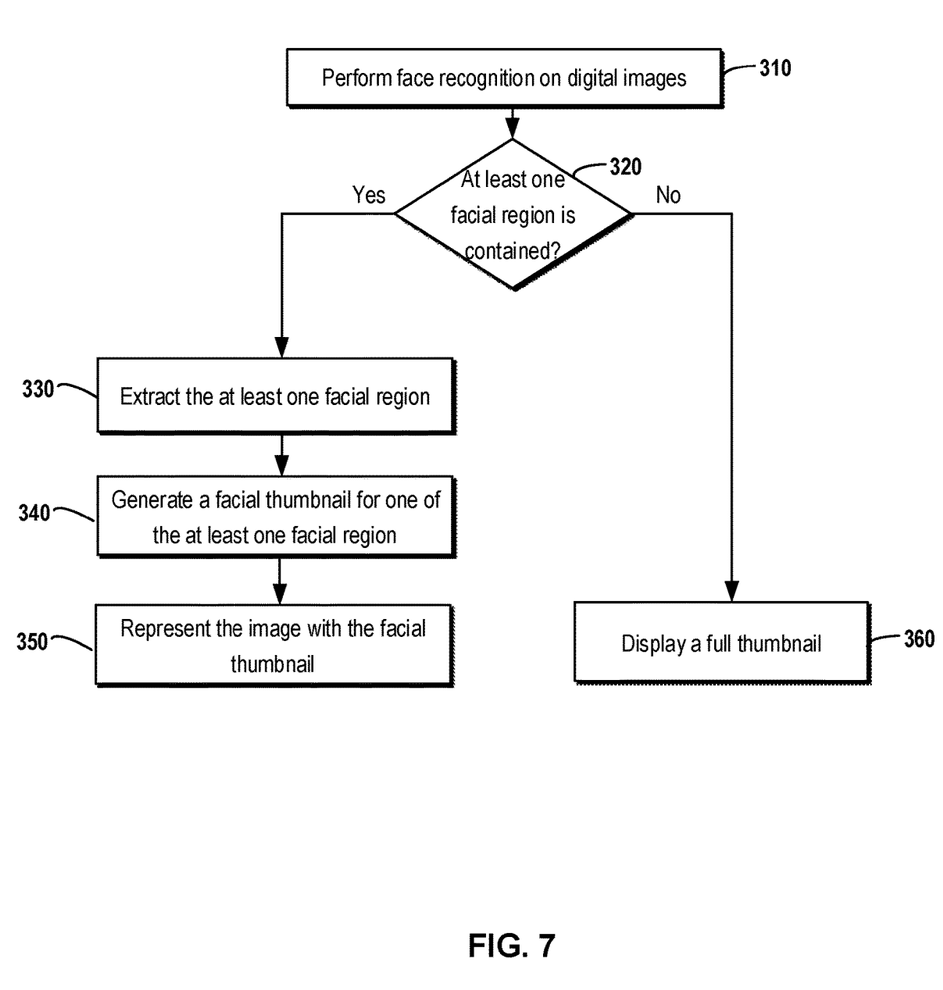
FIG. 7 is a flowchart depicting aspects of operational steps of a method of generating thumbnails for images, in accordance with an embodiment of the present invention.

FIG. 7 is a flowchart depicting aspects of operational steps of a method of generating thumbnails for images, in accordance with an embodiment of the present invention. At block 310, face or facial recognition is performed on digital images so as to detect facial regions in the digital images. In some embodiments, the recognition may be initiated when a "facial mode" is enabled in the computing system 12, as previously described.

At block 320, it is determined whether at least one of the digital images contains at least one facial region. If it is determined that at least one of some of the digital images contains at least one facial region, the method proceeds to block 330.

At block 330, for at least one image in the first group of images, the at least one facial region is extracted. In an example, the at least one image may contain only one facial region, and the facial region can be extracted. In another example, the at least one image may contain a plurality of facial regions, and the at least one facial region can be selected from the plurality of facial regions and extracted.

At block 340, for at least one image in the first group of images, a facial thumbnail is generated for one of the at least one facial region. For example, for the images corresponding to full thumbnails 210-270 in FIG. 4, facial thumbnails 410-470 are generated, as depicted in FIG. 5.

At block 350, for at least one image in the first group of images, the at least one image is represented with respective facial thumbnails.

In some embodiments, the full thumbnails can be replaced with the facial thumbnails for display. For example, the full thumbnails 210-270 in FIG. 4 are replaced with the facial thumbnails 410-470 in FIG. 5. In other embodiments, the full thumbnails and the facial thumbnails can be displayed simultaneously.

On the other hand, if it is determined at block 320 that the at least one image contain no facial region, the method proceeds to 360. For the ease of discussion, in the context of the present disclosure, the images that contain no facial region may be referred to as a second group of images.

At block 360, a full thumbnail for at least one image in the second group of images is displayed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
one or more computer processors, one or more computer-readable storage media, and program instructions stored on one or more of the one or more computer-readable storage media for execution by at least one of the one or more processors, the program instructions, when executed by the at least one of the one or more processors, causing the computer system to perform a method comprising:
displaying, by the computer system, a plurality of digital images organized in an album as a plurality of full thumbnails in a first browsing window, wherein each respective digital image from the plurality of digital images is associated with a respective full thumbnail from the plurality of full thumbnails and each respective full thumbnail is a scaled-down version of each respective digital image;
detecting, by the computer system, a first user input to initiate a facial representation mode via a facial mode button in the first browsing window with respect to the plurality of full thumbnails;
in response to the first user input to initiate the facial representation mode:
detecting, by the computer system, for each of the plurality of digital images whether a first facial region and one or more other facial regions are included in each of the plurality of digital images;
in response to detecting the first facial region and the one or more other facial regions are included in each of the plurality of digital images, extracting, by the computer system, for each of the plurality of digital images, the detected first facial region and the one or more other facial regions;
generating, by the computer system, for each full thumbnail of the plurality of digital images, a plurality of facial thumbnails based on the extracted first facial region and the one or more other facial regions, wherein each generated facial thumbnail from the plurality of generated facial thumbnails comprises a selection of one of:
an enlarged image of the extracted first facial region or an enlarged image of the extracted one or more other facial regions; and
representing, by the computer system, each of the plurality of digital images with a respective first facial thumbnail of the plurality of generated facial thumbnails in a first view;
receiving, by the one or more processors, a selection of the respective first facial thumbnail of the plurality of generated facial thumbnails corresponding to the extracted first facial region for a first image of the plurality of digital images in the first view;
in response to the selection of the respective first facial thumbnail for the first image, displaying, by the computer system, the respective first facial thumbnail for the first image and one or more facial thumbnails of the plurality of generated facial thumbnails corresponding to the extracted one or more other facial regions for the first image in a second view that is different than the first view;
receiving, by the one or more processors, a second user input in the second view, to replace the respective first facial thumbnail for the first image in the first view with a second facial thumbnail of the one or more facial thumbnails corresponding to the extracted one or more other facial regions for the first image from the plurality of digital images, wherein the second facial thumbnail is associated with a second facial region from the one or more other facial regions for the first image from the plurality of digital images;
in response to receiving the second user input in the second view:
replacing, by the one or more processors, the respective first facial thumbnail for the first image in the first view with the second facial thumbnail of the one or more facial thumbnails corresponding to the extracted one or more other facial regions for the first image from the plurality of digital images;
determining, by the one or more processors, a similarity threshold is exceeded between the second facial region associated with the second facial thumbnail for the first image from the plurality of digital images and a second facial region in a second image of the plurality of digital images associated with a second facial thumbnail of the plurality of generated facial thumbnails for the second image from the plurality of digital images; and
responsive to determining the similarity threshold is exceeded between the second facial region associated with the second facial thumbnail for the first image and the second facial region associated with the second thumbnail for the second image, replacing, by the one or more processors, a first facial thumbnail of the plurality of generated facial thumbnails for the second image in the first view with the second facial thumbnail for the second image.

2. The computer system of claim 1, wherein the selection of one of the enlarged image of the extracted first facial region or the enlarged image of the one or more other facial regions is based on a first distance from a center of the digital image to the enlarged image of the extracted first facial region and a second distance from the center of the digital image to the an enlarged image of the one or more other facial regions.

3. A computer program product comprising:
one or more non-transitory computer-readable storage media and program instructions stored on the one or more non-transitory computer-readable storage media for execution by at least one or more processors of a computer system, the program instructions, when executed by the at least one or more processors, causing the computer system to perform a method comprising:
  displaying, by the computer system, a plurality of digital images organized in an album as a plurality of full thumbnails in a first browsing window, wherein each respective digital image from the plurality of digital images is associated with a respective full thumbnail from the plurality of full thumbnails and each respective full thumbnail is a scaled-down version of each respective digital image;
  detecting, by the computer system, a first user input to initiate a facial representation mode via a facial mode button in the first browsing window with respect to the plurality of full thumbnails;
  in response to the first user input to initiate the a facial representation mode:
    detecting, by the computer system, for each of the plurality of digital images whether a first facial region and one or more other facial regions are included in each of the plurality of digital images;
    in response to detecting the first facial region and the one or more other facial regions are included in each of the plurality of digital images, extracting, by the computer system, for each of the plurality of digital images, the detected first facial region and the one or more other facial regions;
    generating, by the computer system, for each full thumbnail of the plurality of digital images, a plurality of facial thumbnails based on the extracted first facial region and the one or more other facial regions, wherein each generated facial thumbnail from the plurality of generated facial thumbnails comprises a selection of one of:
      an enlarged image of the extracted first facial region or an enlarged image of the extracted one or more other facial regions; and
    representing, by the computer system, each of the plurality of digital images with a respective first facial thumbnail of the plurality of facial thumbnails of the plurality of generated facial thumbnails in a first view;
  receiving, by the one or more processors, a selection of the respective first facial thumbnail of the plurality of generated facial thumbnails corresponding to the extracted first facial region for a first image of the plurality of digital images in the first view;
  in response to the selection of the respective first facial thumbnail for the first image, displaying, by the computer system, the respective first facial thumbnail for the first image and one or more facial thumbnails of the plurality of generated facial thumbnails corresponding to the extracted one or more other facial regions for the first image in a second view that is different than the first view;
  receiving, by the one or more processors, a second user input in the second view, to replace the respective first facial thumbnail for the first image in the first view with a second facial thumbnail of the one or more facial thumbnails corresponding to the extracted one or more other facial regions for the first image from the plurality of digital images, wherein the second facial thumbnail is associated with a second facial region from the one or more other facial regions for the first image from the plurality of digital images;
  in response to receiving the second user input in the second view:
    replacing, by the one or more processors, the respective first facial thumbnail for the first image in the first view with the second facial thumbnail of the one or more facial thumbnails corresponding to the extracted one or more other facial regions for the first image from the plurality of digital images;
    determining, by the one or more processors, a similarity threshold is exceeded between the second facial region associated with the second facial thumbnail for the first image from the plurality of digital images and a second facial region in a second image of the plurality of digital images associated with a second facial thumbnail of the plurality of generated facial thumbnails for the second image from the plurality of digital images; and
    responsive to determining the similarity threshold is exceeded between the second facial region associated with the second facial thumbnail for the first image and the second facial region associated with the second thumbnail for the second image, replacing, by the one or more processors, a first facial thumbnail of the plurality of generated facial thumbnails for the second image in the first view with the second facial thumbnail for the second image.

4. The computer system of claim 3, wherein the selection of one of the enlarged image of the extracted first facial region or the enlarged image of the one or more other facial regions is based on a first distance from a center of the digital image to the enlarged image of the extracted first facial region and a second distance from the center of the digital image to the an enlarged image of the one or more other facial regions.

* * * * *